United States Patent [19]
Leve

[11] Patent Number: 5,393,031
[45] Date of Patent: Feb. 28, 1995

[54] ADJUSTABLE TREE STANDS

[76] Inventor: Domenic R. Leve, 825 Parkes Run La., Villanova, Pa. 19085

[21] Appl. No.: 232,888

[22] Filed: Apr. 25, 1994

Related U.S. Application Data

[63] Continuation-in-part of Ser. No. 165,135, Dec. 10, 1993, abandoned.

[51] Int. Cl.⁶ ............................................. F16M 13/00
[52] U.S. Cl. ..................... 248/516; 47/40.5; 248/527
[58] Field of Search .............. 248/516, 523, 527, 514, 248/529, 524; 47/40.5

[56] References Cited

U.S. PATENT DOCUMENTS

| | | | |
|---|---|---|---|
| 2,543,849 | 3/1951 | Hendrickson | 47/40.5 |
| 2,605,067 | 7/1952 | Lindsell | 47/40.5 |
| 2,746,700 | 4/1952 | Barbera . | |
| 2,812,916 | 6/1954 | Jonasson et al. . | |
| 2,893,668 | 10/1954 | Applegate . | |
| 3,051,423 | 4/1953 | Wagner et al. . | |
| 3,142,464 | 7/1964 | Zelfnitz | 47/40.5 |
| 3,231,227 | 4/1966 | Weining . | |
| 3,298,642 | 4/1969 | Taylor . | |
| 3,779,493 | 12/1973 | Gidlof | 47/40.5 |
| 4,156,323 | 5/1979 | Scheffler | 47/40.5 |
| 4,541,601 | 9/1985 | Corbisello | 248/516 |
| 4,571,882 | 2/1986 | Capen | 47/40.5 |
| 4,913,395 | 4/1990 | Juhas | 248/516 |
| 5,014,461 | 5/1991 | Brhucke | 248/529 |
| 5,137,246 | 8/1992 | Idso | 248/523 |

FOREIGN PATENT DOCUMENTS

| | | | |
|---|---|---|---|
| 224304 | 1/1910 | Germany | 248/516 |
| 207536 | 11/1939 | Switzerland | 47/40.5 |
| 2115479 | 9/1983 | United Kingdom | 248/516 |

Primary Examiner—J. Franklin Foss
Attorney, Agent, or Firm—Michael F. Petock

[57] ABSTRACT

An adjustable tree stand utilizes a bowl and base structure. The lower end of a tree trunk is mounted into the bowl and fastened thereto utilizing a plurality of threaded turn screws which engage the side of the tree trunk and a spike at the bottom of the bowl. In one embodiment, a hemispherical shaped bowl is mounted into the base, with the base being shaped to conform to the shape of the bowl, such that it may be pivotally adjusted to adjust the tree so that it appears vertical. The bowl is then locked in place in the base by means of a lever operated cam stopper. The upper end of the bowl may be provided with a stopper ring lip which engages at one point a recess of a predetermined depth when adjusted to the pivotal position which is the maximum deviation from vertical. In a presently preferred embodiment, the bowl need not be hemispherical shaped and is provided with a bearing assembly which projects into a recess formed in the base. The bearing assembly has one ring secured to the bowl and the other ring may be seated on a lip of the recess in the base. The recess is larger than the bearing assembly, and the bowl with its bearing assembly may be tilted to provide the appearance of a vertical tree even though the tree is crooked. The bearing assembly may be locked both with respect to rotation about the vertical axis and with respect to tilt by means of a friction band which is operable to engage and disengage the bearing assembly.

28 Claims, 10 Drawing Sheets

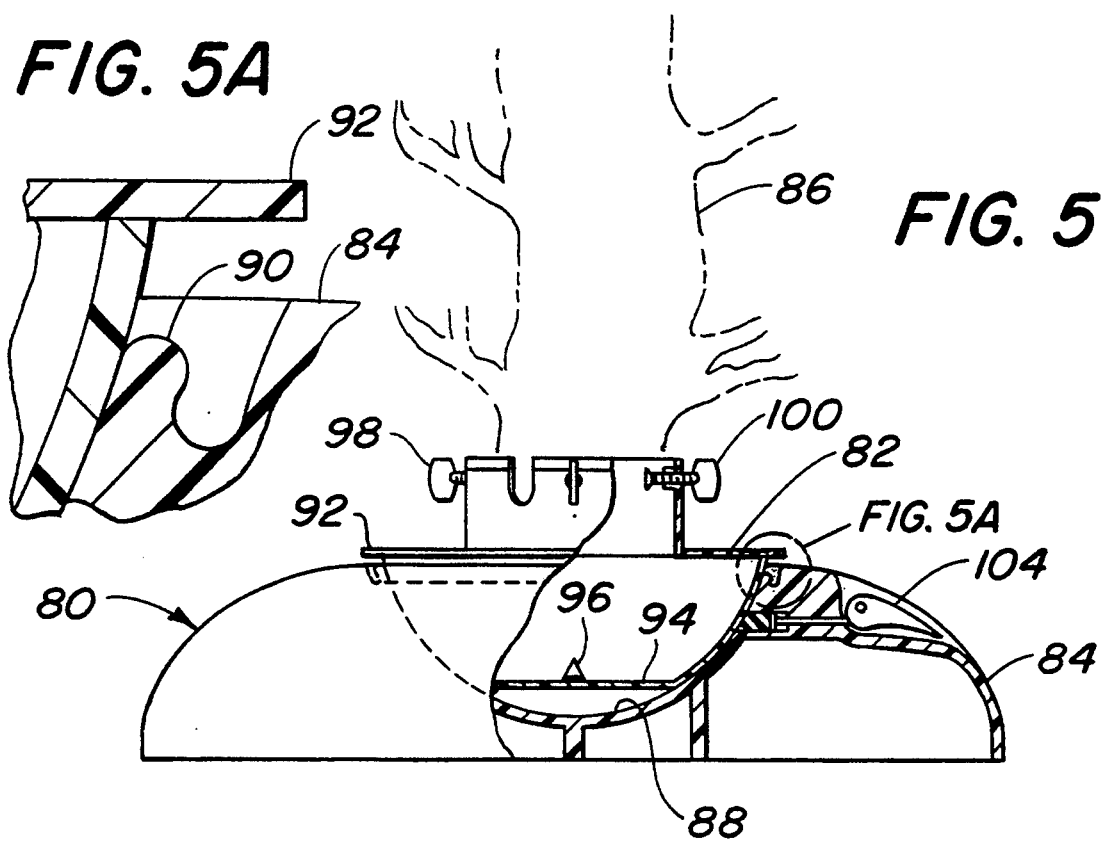
FIG. 5A
FIG. 5
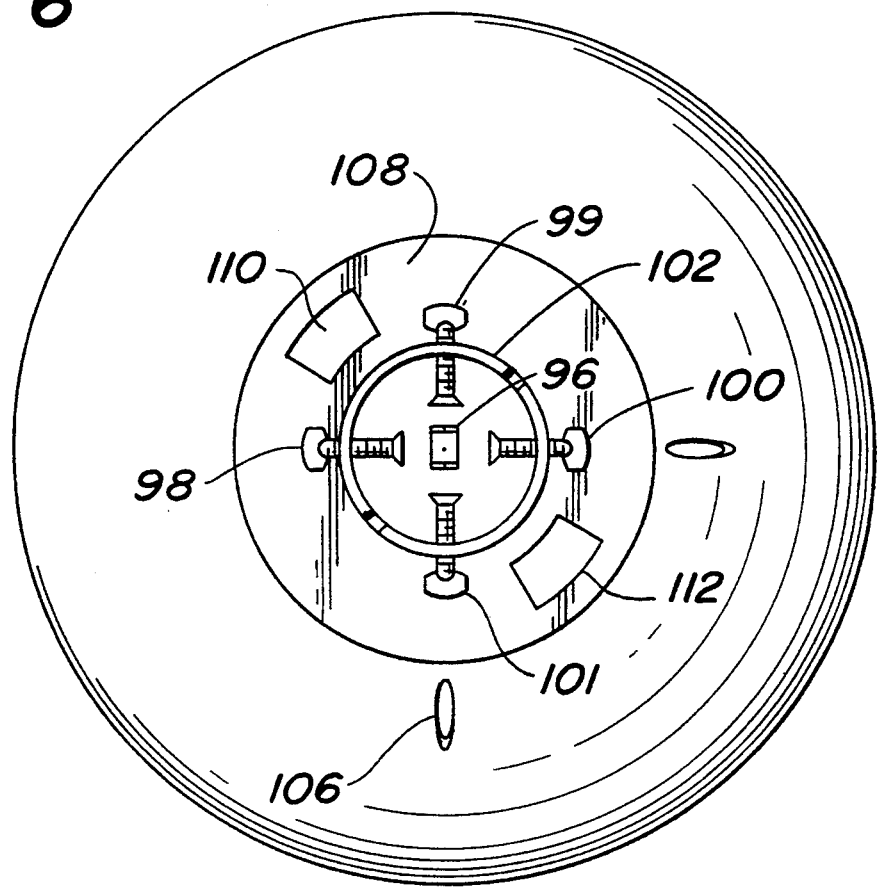
FIG. 6

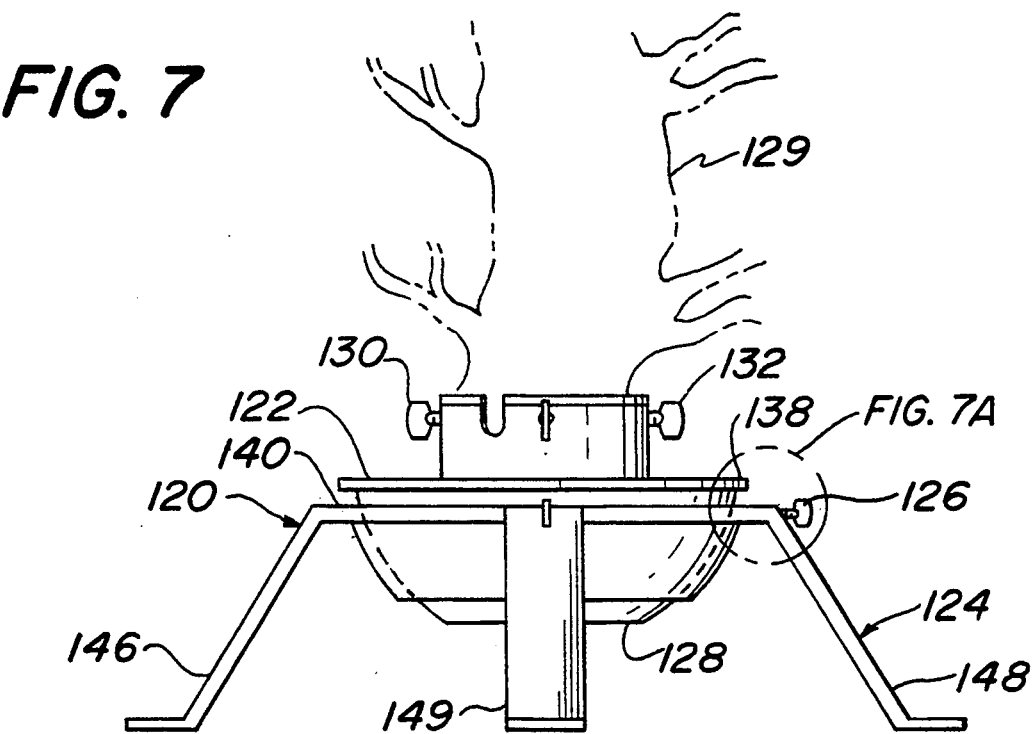
FIG. 7
FIG. 7A
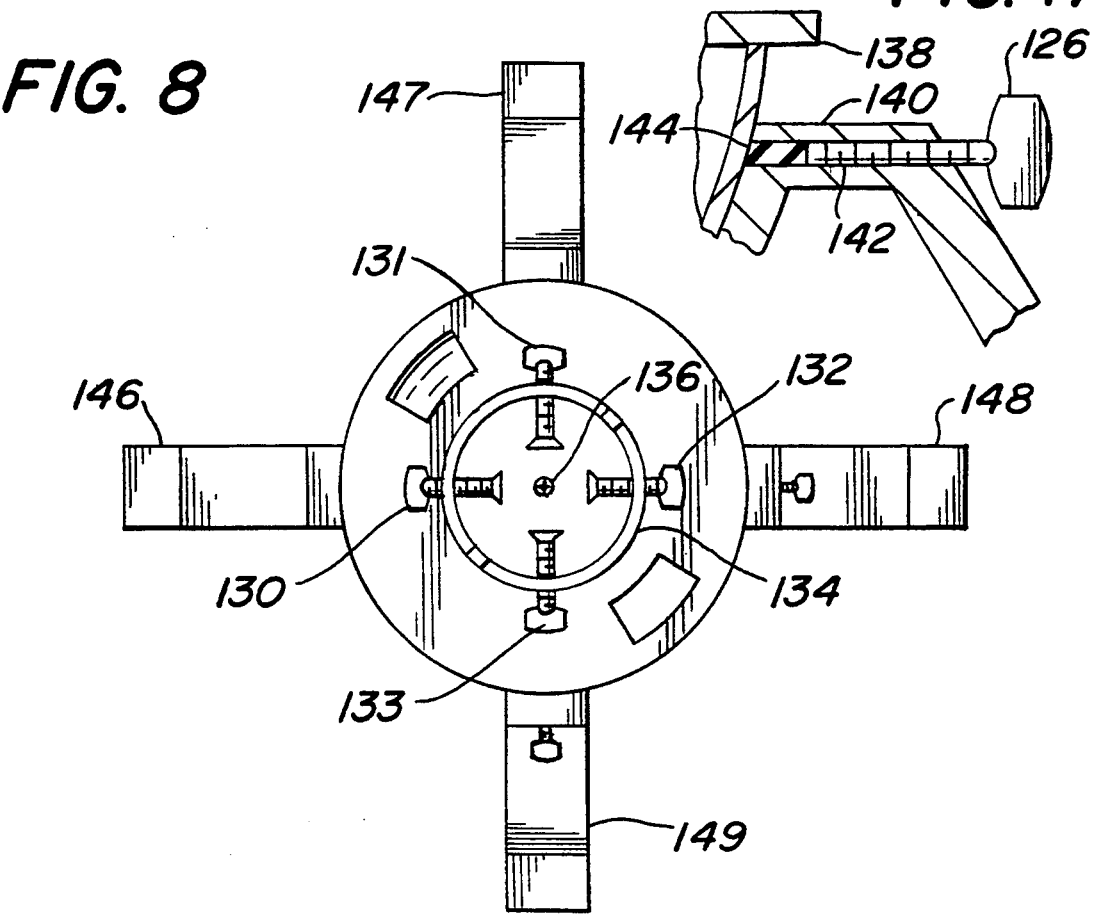
FIG. 8

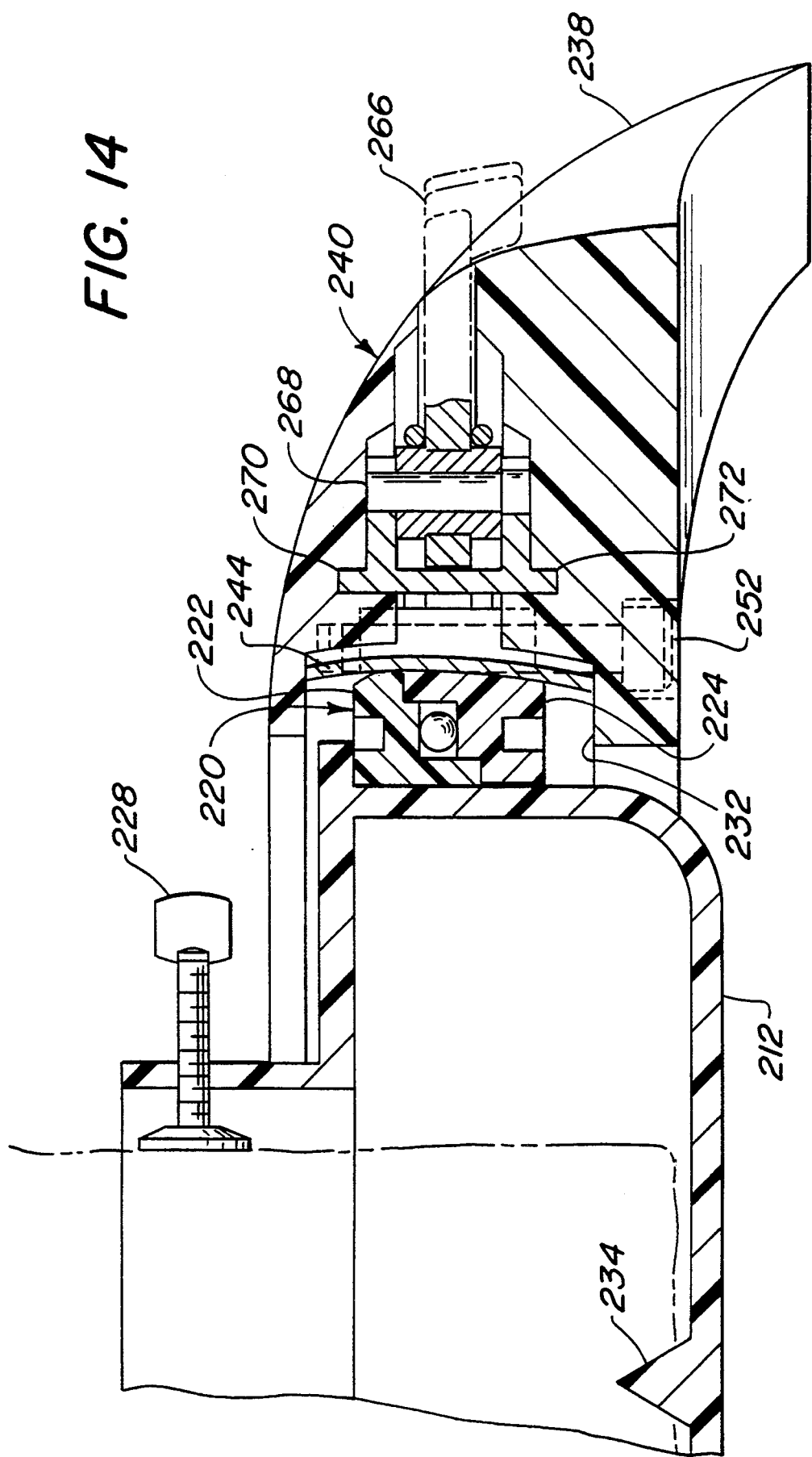

ADJUSTABLE TREE STANDS

CROSS REFERENCE TO RELATED APPLICATION

This is a continuation-in-part application of application Ser. No. 08/165,135, filed Dec. 10, 1993, now abandoned by the inventor herein and entitled "AN ADJUSTABLE TREE STAND". The benefits of the filing date of this earlier application for so much as is common with this application is hereby claimed.

FIELD OF THE INVENTION

The present invention relates to tree stands. More particularly, the present invention relates to an improved adjustable tree stands for use with cut trees or artificial trees, and particularly for use with trees which are sometimes referred to as Christmas trees, but the invention may find application at any place or time of the year where it is necessary to provide a stand for a tree.

BACKGROUND OF THE INVENTION

The cutting of an Evergreen tree and placing it in a stand within a home or building during the Christmas season of the year has been a long tradition in this country, as well as others. However, it has been known that not all of the trunks of Evergreen trees grow perfectly straight. Accordingly, there is often a problem in mounting the tree in the stand so that it appears to be vertically mounted when somewhere along the trunk of the tree there is a bend.

There have been various attempts in the past to solve this problem, for example see U.S. Pat. No. 4,913,395—Juhas wherein Juhas discloses a pair of crossed gimbal structures mounted within a bowl. U.S. Pat. No. 4,541,601—Corbisello discloses a bowl structure mounted within the water container with the bowl free to rotate and the tree being aligned by means of fastening bolts which engage the side of the tree trunk. Various other structures for providing an adjustable or pivotally tree stand are disclosed in the following U.S. Pat. Nos.: 3,298,642—Taylor; 4,156,323—Scheffler; 2,746,700—Barbera; 2,812,916—Jonasson, et al.; 2,893,668—Applegate; 3,051,423—Wagner, et al.; and 3,231,227—Weining.

The present invention provides an improved adjustable tree stand.

SUMMARY OF THE INVENTION

The present invention is directed to an adjustable tree stand which utilizes a bowl and base member structure. The lower end of a tree trunk is mounted into the bowl and fastened thereto, the bowl is then mounted into the base member, adjusted and locked in position by a stopper.

More particularly, in one embodiment the adjustable tree stand of the present invention comprises a bowl which is adapted to be mounted to the lower end of a tree trunk utilizing fasteners for engaging the side of the tree trunk at a predetermined distance from the lower end of the tree trunk. A means is mounted to the bottom of the bowl for engaging the cut end of the trunk which may be in the form of a spike. A base member is provided which is shaped substantially to conform to the shape of the bowl and adapted to receive the bowl. The bowl is adapted to be pivotally adjustable within the base. The base is provided with a stopper member mounted within the base for frictionally engaging the bowl to lock the bowl in the desired pivotally adjusted position.

In a presently preferred embodiment the bowl which includes fasteners for engaging the side of the tree trunk a predetermined distance from the lower end of the trunk and means mounted to the bottom of the bowl for engaging the cut end of the trunk is provided with a bearing assembly mounted on the bowl. The base, which is adapted to receive the bowl, is provided with means for retaining the bearing assembly within a predetermined angle measured from horizontal, the bowl may then be pivotally adjustable both rotationally and as measured from vertical within the base. A locking means is mounted within the base for frictionally engaging the bearing assembly to lock the bowl in the pivotally adjusted position. In a presently preferred embodiment, the bearing assembly is received at least partially within a recess in the base and the locking means may be in the form of a band which frictionally engages the bearing assembly. The friction band may be provided with an adjusting means.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 5 is an elevation view, partially broken away and partially in cross-section of another embodiment of an adjustable tree stand in accordance with the present invention.

FIG. 5A is an exploded cross-sectional view of the structure shown in FIG. 5 within the circle identified as FIG. 5A.

FIG. 6 is a plan view of the embodiment of the adjustable tree stand shown in FIG. 5 with the tree trunk removed.

FIG. 7 is an elevation view of still another embodiment of an adjustable tree stand in accordance with the present invention.

FIG. 7A is an exploded cross-sectional view of the structure shown in FIG. 7 within the circle identified as FIG. 7A.

FIG. 8 is a plan view of the embodiment of an adjustable tree stand shown in FIG. 7 with the tree trunk removed.

FIG. 14 is a cross sectional view taken along line 14—14 of the embodiment shown in FIG. 12.

DETAILED DESCRIPTION OF THE PREFERRED EMBODIMENTS

Figure 1:
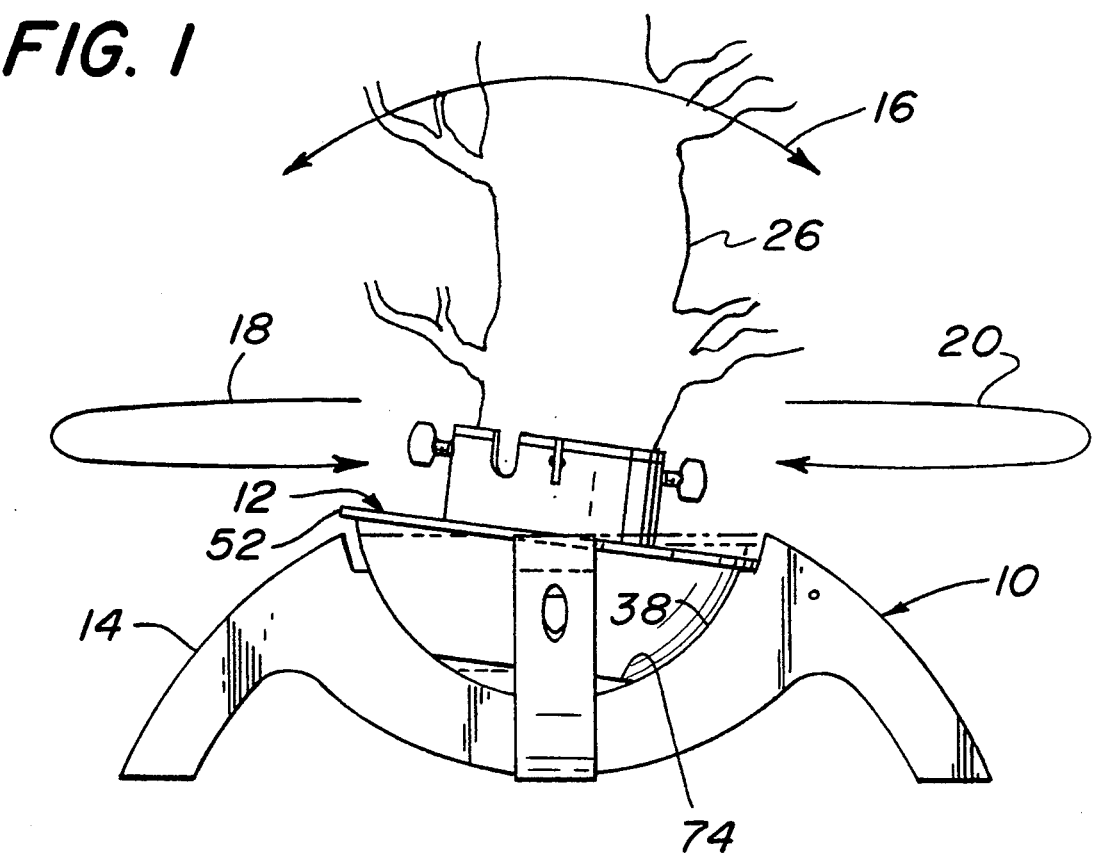
FIG. 1 is an elevation view of one embodiment of an adjustable tree stand in accordance with the present invention.

Referring now to the drawings, wherein like numerals indicate like elements, there is shown in FIGS. 1, 2, 3 and 4 one embodiment of an adjustable tree stand 10. Adjustable tree stand 10 includes a bowl 12 adjustable mounted within a base 14. Bowl 12 may be adjusted to produce deviations from the true vertical or true plumb, substantially in the directions of double headed arrow 16 or rotated in the rotational directions illustrated by arrows 18 and 20. Once adjusted, base 14 may be locked in place by one or more stoppers, two stoppers being preferred and being illustrated as stoppers 22 and 24 in FIG. 2.

Figure 3:
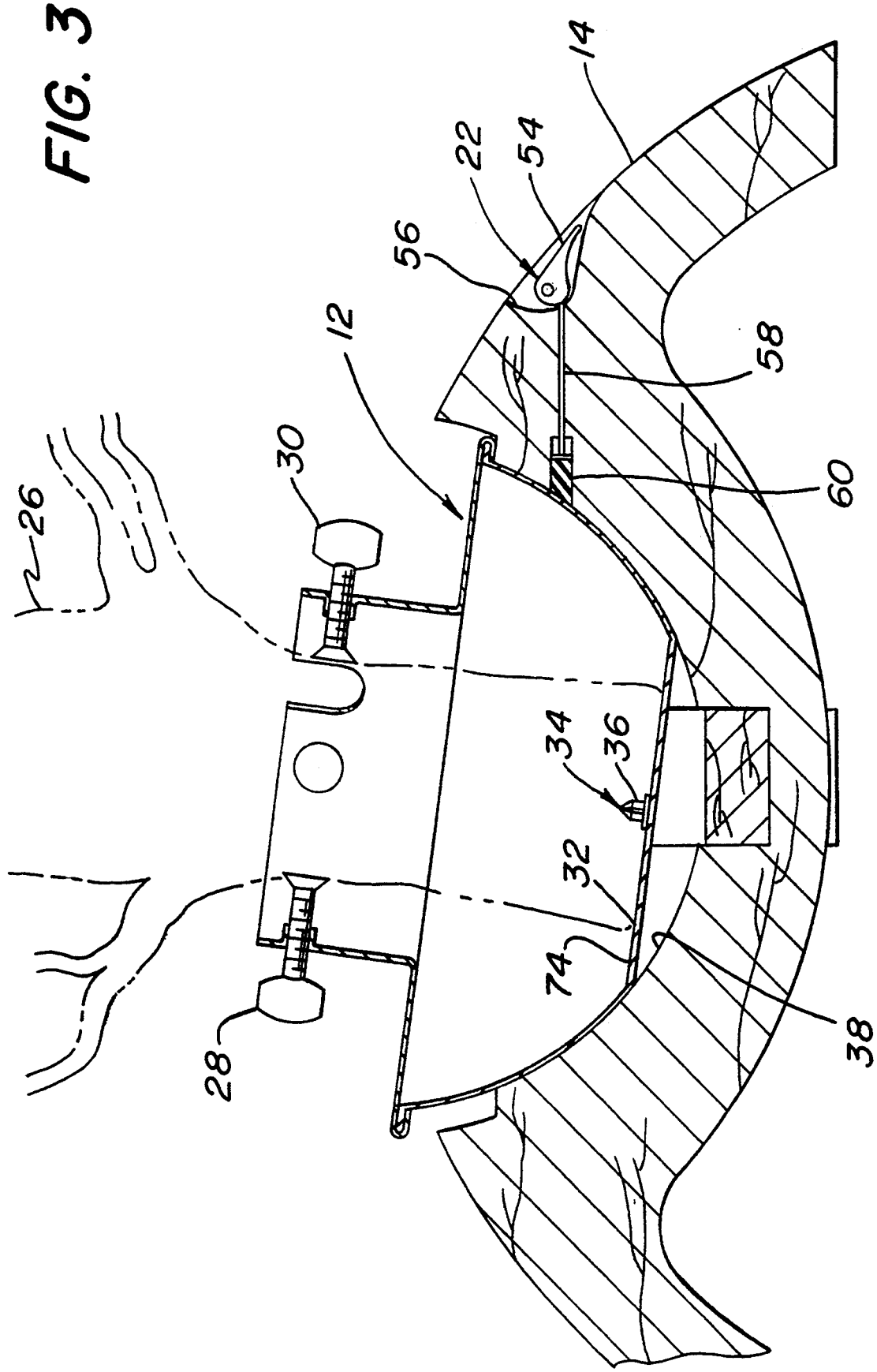
FIG. 3 is a cross-sectional view taken along line 3—3 of FIG. 2.

Bowl 12 is adapted to receive a tree trunk illustrated at 26 in FIGS. 1 and 3. Particularly as shown in FIG. 1, and as commonly occurs, tree trunk 26 is not perfectly straight. Accordingly, it is desirable, in order to maximize the appearance of the tree as mounted in the stand, to be able to adjust the lower end of the tree trunk with respect to the true vertical direction in order to maximize the appearance of the overall tree as being substantially vertical. The present invention, by use of bowl 12, which is tiltably within base 14 and lockable in any position by stoppers 22 and 24 enable this function to be preformed easily. The bowl may also be easily rotated within base 14.

As may be best seen in FIG. 3, the lower end of tree trunk 26 is mounted to the bowl by a plurality of fasteners 28 through 31 which engage the side of the tree trunk a predetermined distance from the lower end 32 of the tree trunk. The lower end of the tree trunk 32 is mounted to the bottom of the bowl by a spike which engages the cut lower end 32. Spike 34 as illustrated, is preferably a pin having one or more lateral projections 36, which not only engages the tree trunk, but also prevents rotation of the trunk with respect to the bowl. As described above, once the bowl 12 is mounted to the lower end of a tree trunk, the bowl may be adjusted within base 14 both with respect to deviations from the true vertical as well as rotational adjustment. This fully enables the best presentation of the tree in any particular desired direction.

Figure 4:
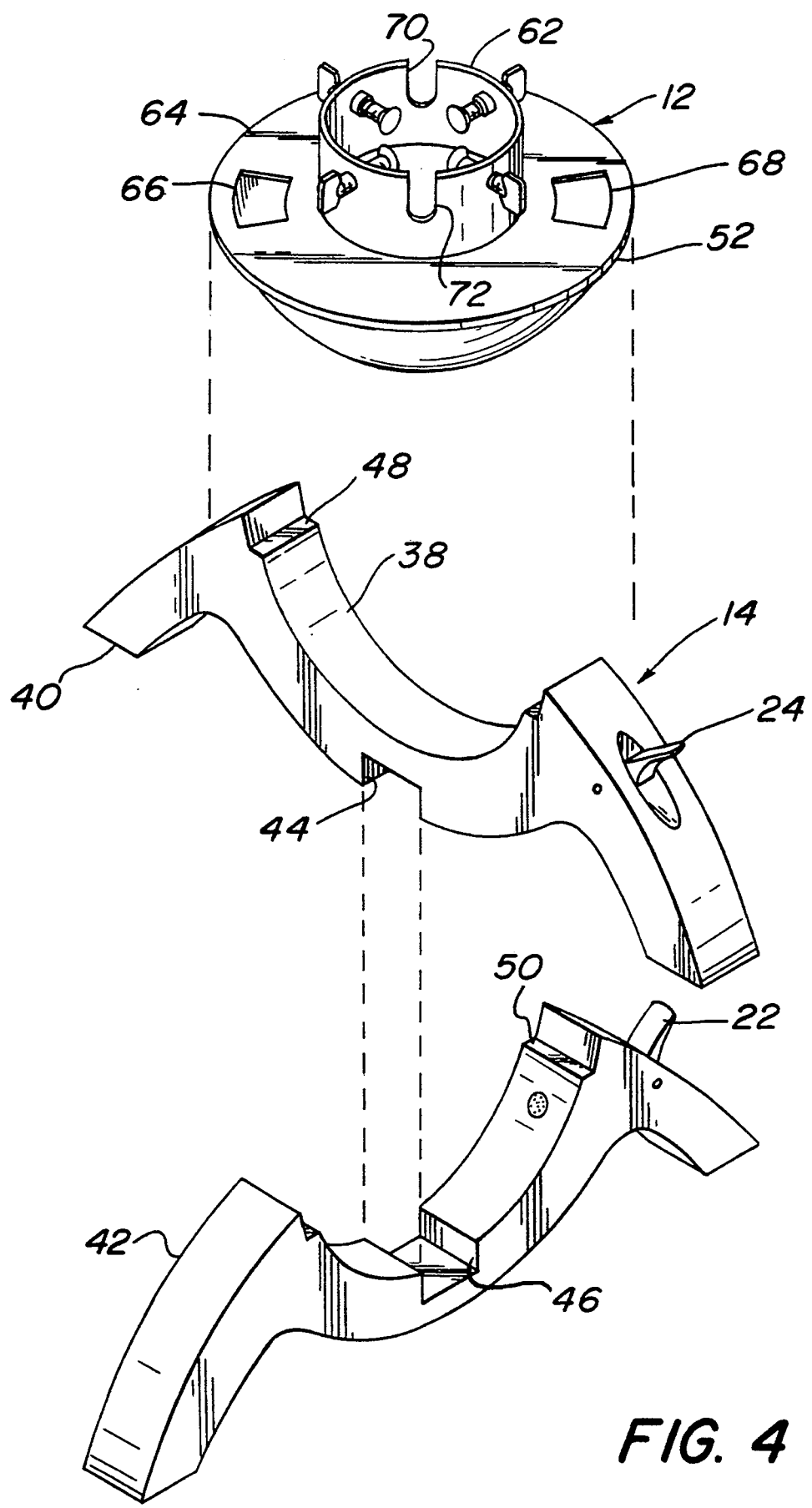
FIG. 4 is an exploded view in perspective of the adjustable tree stand shown in FIG. 2.

The base 14 is shaped substantially to conform to the shape of the bowl and is adapted to receive the bowl, as best illustrated in FIGS. 1, 3 and 4 at 38. Due to the shape 38 of the base members, the bowl is adapted to be pivotally adjustable within said base, that is rotatable with respect to true vertical. As described above, the bowl may also be rotated within the base 30 in view of the bowl or hemispheric shape of the mating bowl 12 and portion of base 14.

Illustrated best in FIG. 4, base 14 may be comprised of a pair of interlocking members 40 and 42. Members 40 and 42 may be substantially identical except for the actual area of interlock comprised of recess 44 in interlocking member 40 and recess 46 in interlocking member 42. Interlocking members 40 and 42 may be bonded together by adhesive or any other suitable fastening means including rivetting, bolting, welding or the like. Interlocking members 40 and 42 may be comprised of wood, synthetic material or metal, although preferably the embodiment illustrated in FIGS. 1 through 4 would be comprised of either wood or a synthetic plastic material.

As may be seen, particularly from FIGS. 1, 3 and 4, interlocking members 40 and 42 may be provided with recesses 48 and 50, respectively, which cooperate with a stopper ring lip 52 on bowl 12 to limit the amount of pivotal adjustment. When the stopper ring lip 52 engages at one point a recess of predetermined depth as illustrated, the tree trunk 26 will be adjusted to the pivotal position which is the maximum deviation from the vertical. Accordingly, a reasonably safe limit of adjustment may be provided by such a recess, preventing excess deviation.

Figure 2:
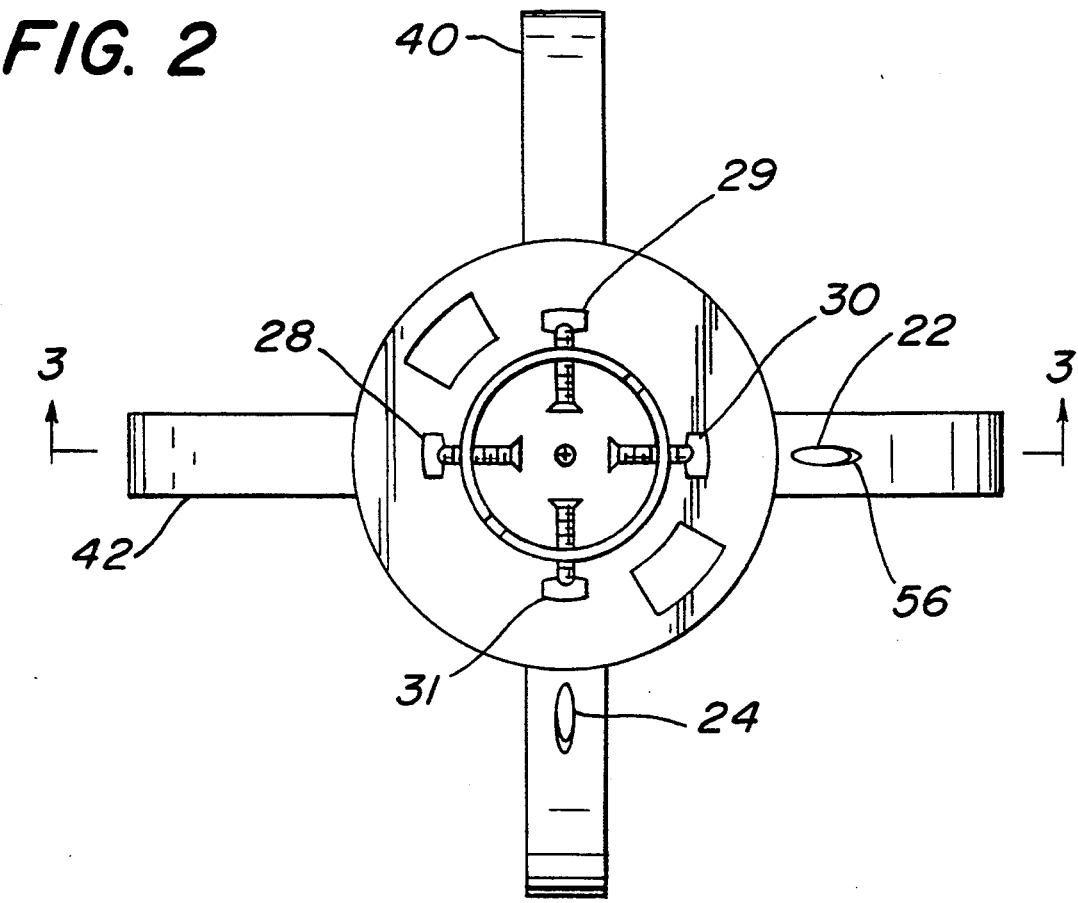
FIG. 2 is a plan view of the embodiment of an adjustable tree stand shown in FIG. 1 with the tree trunk removed.

Once the bowl is adjusted to the desired pivotal deviation, as well as any rotational deviation that may be desired, the bowl may be locked in position by causing stoppers 22 and 24 to fictionally engage the bowl 12. Although a single stopper may be utilized and various other types of stoppers may be utilized to secure the bowl in position, it is presently preferred that two stoppers be utilized, as illustrated in FIGS. 2 and 4 at 22 and 24. A suitable stopper structure is illustrated in FIG. 3, which is a presently preferred embodiment. As illustrated in FIG. 3, the stopper may be operated or caused to engage bowl 12 by pressing down on cam lever 54, either with one of the fingers such as the thumb or by foot pressure. Cam lever 54 is preferably mounted within an elliptical finger relief 56, best illustrated in FIG. 2. The operation of cam lever 54 causes a rod 58 to force a friction engaging element, such as a rubber pad 60 against bowl 12 securing it in position. The structure of stopper 24 may be identical to that of stopper 22.

As may be seen from FIGS. 1 through 4, fasteners 28-31 are mounted in a centrally disposed ring 62 through which the tree trunk passes. Ring 62 may be mounted to the bowl 12 by suitable straps, braces or other suitable mounting structure. However, in a presently preferred embodiment, ring 62 is connected to the outer periphery of bowl 12 by a cover 64 which substantially closes the top of bowl 12 from ring 62 to its periphery. Cover 64 is provided with openings 66 and 68 to enable water and other nutrients to be easily poured into bowl 12.

As may be best seen in FIGS. 1, 3 and 4, ring 62 may be provided with one or more recesses for tree branches. Recesses are illustrated in ring 62 at 70 and 72. The provision of such recesses enables one or more branches, which would otherwise need to be cut off to enable mounting in the bowl, to be maintained for a fuller tree look by adjusting the recess 70 and/or 72 to accept the lowest branch on the tree.

Additionally, as best illustrated in FIGS. 1 and 3, bowl 12 may substantially take the shape of a hemisphere with a flattened bottom illustrated at 74.

Referring now to FIGS. 5 and 6, there is shown an alternate embodiment of an adjustable tree stand 80 in accordance with the present invention. Adjustable tree stand 80 is comprised of a bowl 82 which is substantially similar to bowl 12 described with respect to FIGS. 1 through 4. However, bowl 82 is illustrated as being comprised of a synthetic material, such as one of the synthetic resins, but it is understood that it may also be constructed of metal. Bowl 82 is illustrated as being provided with a stopper ring lip 92 similar to stopper ring lip 52 of bowl 12. However, it is understood that the embodiment of the adjustable tree stand 80 may be provided with a bowl without an adjustable stopper ring lip and recess formed within base 84.

Base 84 is illustrated as being comprised of a synthetic material, such as one of the resins, but it is understood that it may be formed of metal, wood or other materials. Base 84 is provided with a hemispheric shaped receptacle 88 to matingly receive bowl 82. Bowl 82 is provided with a flattened bottom 94 similar to the flattened bottom 74 of bowl 12. The flat bottom 94 of bowl 82 is provided with an alternate embodiment of a spike 96 which may be comprised of a pair of spaced vertically projecting triangles as may be best seen by considering FIGS. 5 and 6 together.

As may be seen best in FIG. 5A, base 84 may be provided with a resilient bead 90 which may be beneficial in assisting in securing bowl 82 in a locked position. Resilient bead 90 may be integrally formed in base 84 where base 84 is made of a synthetic material. If base 84 is made of metal, wood or other non-resilient material, the bead may be secured to the base by suitable fastening means including adhesive, rivets, spot welding or other suitable means. The use of the bead 90 may be particularly advantageous where bowl 82 in FIG. 5 or the bowl of any of the other embodiments is constructed of stamp steel and may not be perfectly round. Although the bowl may be produced to be perfectly round, it is economically advantageous to use a less expensive stamping process and provide a resilient contact such as bead 90 within the base. Resilient contact, such as bead 90 may be utilized in all of the embodiments described herein, although it is not required. The contact or bead 90 may be made of any suitable fairly rigid material having some predetermined amount of resilience, and is preferably contemplated to be made of a composition of vinyl and polypropylene or hard rubber.

Similar to the embodiment described with respect to FIGS. 1 through 4, the lower end of a tree trunk 86 is secured in bowl 82 by means of fasteners 98 through 101 mounted in ring 102 as well as spike 96 at the bottom of cut end of trunk 86. In the preferred method of use of the invention, the base 82 is attached to the lower end of trunk 86 and the bowl 82 is then mounted in base 84, adjusted and locked in position by cam lever operated stoppers 104 and 106. It is understood that other forms of stoppers, including a threaded screw type fastener may be utilized in securing the bowl in position in any of the embodiments disclosed herein. However, it is understood that the bowl 82 may be locked in the base by the cam operated stoppers 104 and 106, the tree trunk 86 inserted into the bowl, the stoppers released for adjusting the tree and then re-locked.

As described with respect to the embodiment shown in FIGS. 1 through 4, bowl 82 may be provided with a cover 108 having openings 110 and 112 for ease in providing water and other nutrients to the tree.

Referring now to FIGS. 7 and 8, there is shown another embodiment of an adjustable tree stand 120. Adjustable tree stand 120 is comprised of a bowl 122 and a base 124 which includes a stopper 126 for locking bowl 122 with respect to base 124.

Bowl 122 may be substantially identical to bowl 12 shown and described with respect to FIGS. 1 through 4. As may be seen, bowl 122 is substantially in the shape of a hemisphere with a flattened bottom 128. The lower end of tree trunk 129 is held in bowl 122 by means of fasteners 130 through 133, mounted in centrally disposed ring 134, and spike 136. Bowl 122 is provided with a stopper ring lip 138 which may be best seen in FIG. 7A.

As may be best seen in FIG. 7A, stopper ring lip 138 cooperates with surface 140 of base 124. As described with respect to FIGS. 1 through 4, stopper ring lip 138 cooperates with surface 140 to limit the amount of pivotal adjustment of bowl 122, and accordingly tree trunk 129, with respect to the vertical. As best illustrated in FIG. 7A, stopper 126 may be comprised of a threaded screwable fastener 142 provided with a friction tip 144 which may be comprised of rubber or other suitable material.

As may be seen best in FIG. 8, the base 124 is provided with four supporting legs 146 through 149. Base 124 is preferably comprised of metal, however other suitable materials including rigid synthetic materials may be utilized in the fabrication of base 124 and bowl 122. Threaded fastener 126, or other suitable fasteners, may be utilized with any of the embodiments disclosed herein, although for convenience, the cam operated lever arrangement described with respect to the previous embodiments is presently preferred.

Figure 9:
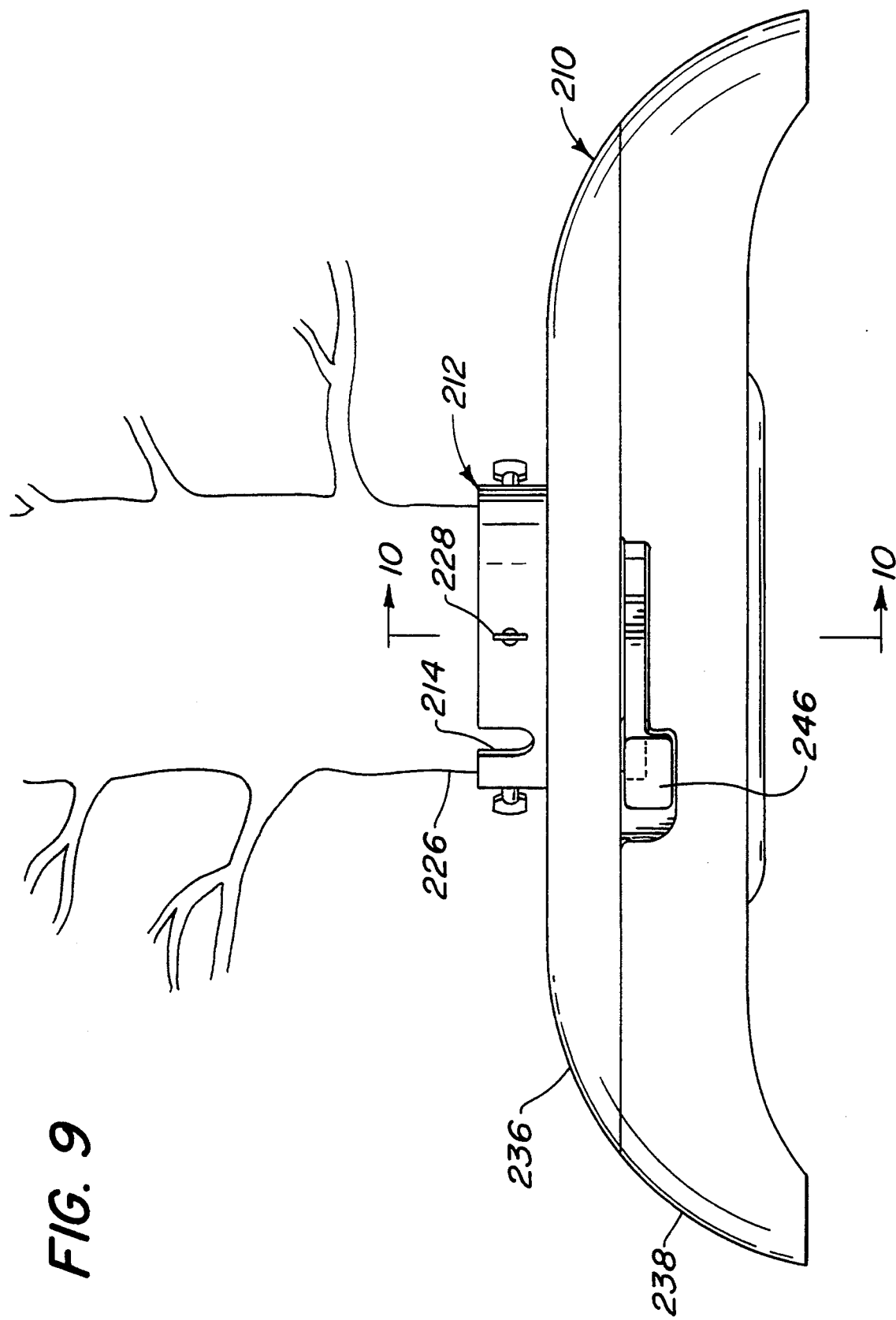
FIG. 9 is an elevation view of a presently preferred embodiment of an adjustable tree stand in accordance with the present invention.
Figure 10:
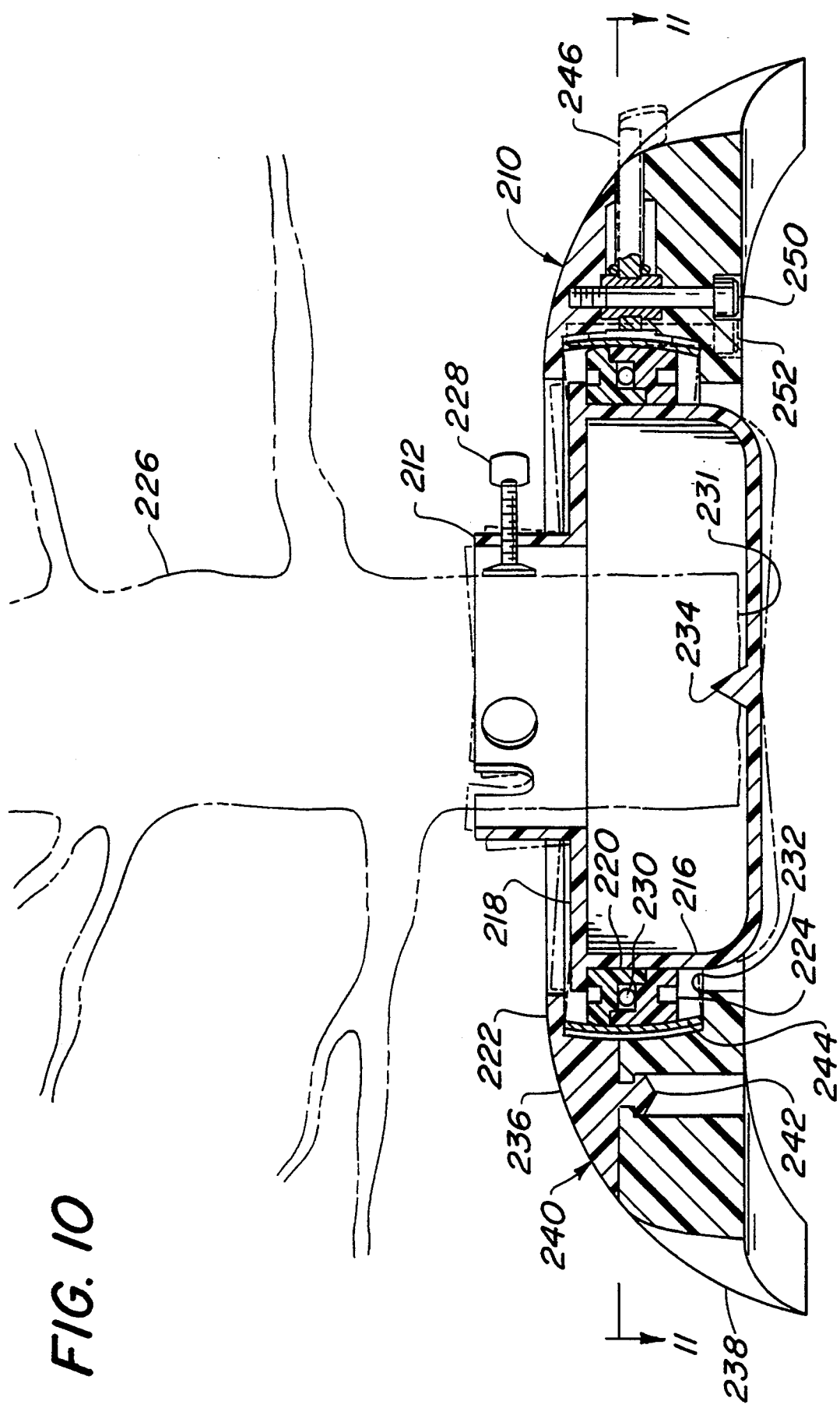
FIG. 10 is a cross sectional view taken along line 10—10 of FIG. 9.
Figure 11:
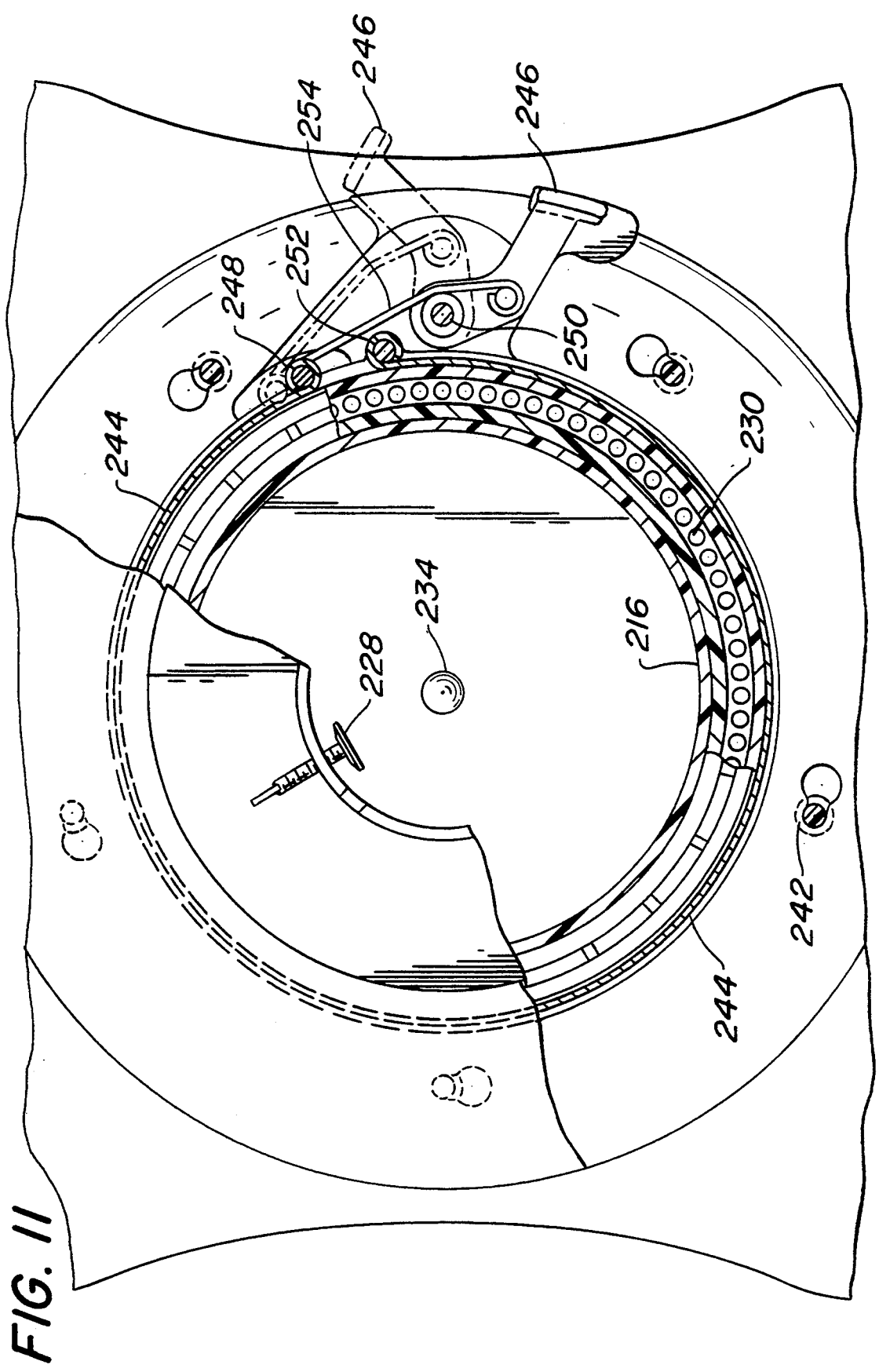
FIG. 11 is an elevation view, partially broken away and partially a cross sectional view taken along line 11—11 of FIG. 10 in accordance with the present invention.

Referring now to FIGS. 9, 10, and 11, there is shown another embodiment of an adjustable tree stand 210, which is a presently preferred embodiment, wherein a lower end or cut end of a tree trunk 226 may be mounted in a bowl 212 in a manner similar to that described with respect to bowl 12. As described in greater detail with respect to bowl 12, a plurality of fasteners 228 are provided for engaging the side of the tree trunk at a predetermined distance from the lower end 231 of the tree trunk 226 and a means 234 is mounted to the bottom of bowl 212 for engaging the cut end 231 of the tree trunk. Means 234 may be a spike of the type described previously or may be any other means for preventing the bottom of tree trunk 226 from moving. The upper flange of bowl 212 may be provided with one or more recesses 214 for branches as described with respect to the previous bowls.

Bowl 212, as may be best seen in FIG. 10, may have substantially vertical side walls 216 and need not be hemispherically shaped, although it may be. The upper portion of bowl 212 may be provided with a cover 218 which may have openings for pouring in water and other nutrients as described previously with respect to the other bowls. Cover 218 may project slightly beyond sidewall 216 as shown, although this is not necessary.

A bearing assembly 220 is mounted on the outer surface of sidewall 216 and is comprised of a first ring 222 and a second ring 224. One of the rings 222 or 224 is secured to the outer wall 216 of bowl 212. In a presently preferred embodiment, the upper ring 222 is fictionally or force fit secured to the outer surface of wall 216. However, it is understood that other methods of securing one of the rings to the outer surface of wall 216 are within the spirit and scope of the present invention, including adhesives, spot welding, rivets and the like. If rivets are utilized, a sealer may have to be provided around the rivet holes. The bearing assembly includes bearings 230 between first ring 222 and second ring 224 as may be best seen in FIGS. 10 and 11. As illustrated, bearings 230 are ball bearings, but it is understood that other types of bearings may be utilized.

Bearing assembly 220 projects at least partially into a recess 232 formed in base 240. For purposes of clarity, bearing assembly 220 is shown as being substantially centered within recess 232, but it is understood that if the tree were a straight tree and mounted vertically, lower or second ring 224 would be in contact with the lower edge of recess 232 and this would be the weight bearing surface. As illustrated in FIG. 10, for trees that are not straight, an adjustment may be made so that the tree will present a vertical appearance which will result in bowl 212 being adjusted such that the bowl will take on the deviation from horizontal as shown by the dotted or phantom lines on one side or the other of FIG. 10.

As may be seen in FIG. 10, base 240 is comprised of a lower portion 238 and an upper portion 236 which may be secured together by suitable fastening means such as pin and key hole fastener 242. However, other suitable types of fasteners may be utilized. The use of the upper and lower sections of the base enables the bowl 212 with its bearing assembly 220 to be easily placed in recess 232 and the two portions of the base assembled so that the recess is formed retaining the bearing assembly 220 within base 240. As is known, the pin and key hole fasteners are locked by inserting the pins through the larger portion of the key hole and slightly rotating the upper portion 236 with respect to the lower portion 238 of base 240 to secure the portions together. These are then locked in place by bolts 250 and 252 which have other functions which will be described hereinafter.

The bearing assembly 220 mounted on bowl 212 allows the tree to be readily and easily rotated even though the tree may have significant weight. In other words, the bearing assembly 220 allows ease of rotation about the axis of the tree trunk. Additionally, the ability of the bearing assembly 220 to move up and down in the recess allows the bowl to be pivotally adjusted with respect to an angle measured from horizontal, that is measured from the plane between upper section 236 and lower section 238 of base 240. The amount of adjustment or a predetermined angle of adjustment of bowl 212 is limited by the height or depth of recess 232 in base 240 measured in a vertical direction. For example, referring to FIG. 10, the upper portion of the tree may be tilted to a maximum amount towards the left by causing lower ring 224 to engage the lower surface or lip of recess 232 on the left side of FIG. 10 and causing the upper surface of ring 222 to contact the upper surface of recess 232 on the right side of FIG. 10. Such deviation is illustrated by the dotted lines.

Once the bowl, and accordingly tree trunk 226 is adjusted pivotally both rotationally and as measured from vertical within base 240, the bowl may be stoppered or locked in this position by a locking means which includes band 244 which fictionally engages both first ring 222 and second ring 224 of bearing assembly 220. Band 244 is substantially in contact with the upper and lower surfaces of recess 232, and accordingly secures bearing assembly 220 and bowl 212, to which one of the rings of the bearing assembly is secured to prevent further movement of bowl 212 with respect to deviations from vertical and also prevents further rotational movement as the upper and lower rings 222 and 224 are locked together by band 244. Band 244 which operates similar to a brake band, is operated by means of lever 246 which is pivotally mounted on base 240. Lever 246 is accessible through an opening in base 240.

As may be best seen in FIGS. 10 and 11, the band 244 is engaged by forcing lever 246 into the position shown in solid lines. The band 244 is released by pulling lever 246 to the position shown in dotted lines. One end of band 244 is secured to base 240 by bolt 252. The other end of band 244 is pinned at 248 to a connector 254 which connects it to lever 246. Accordingly, the band 244 may be caused to fictionally engage or disengage upper ring 222 and lower ring 224 of bearing assembly 220 by operation of lever 246. When engaged, band 244 locks or secures the bearing assembly preventing rotation about the tree axis and preventing tilting of bowl 212 as previously described.

Figure 12:
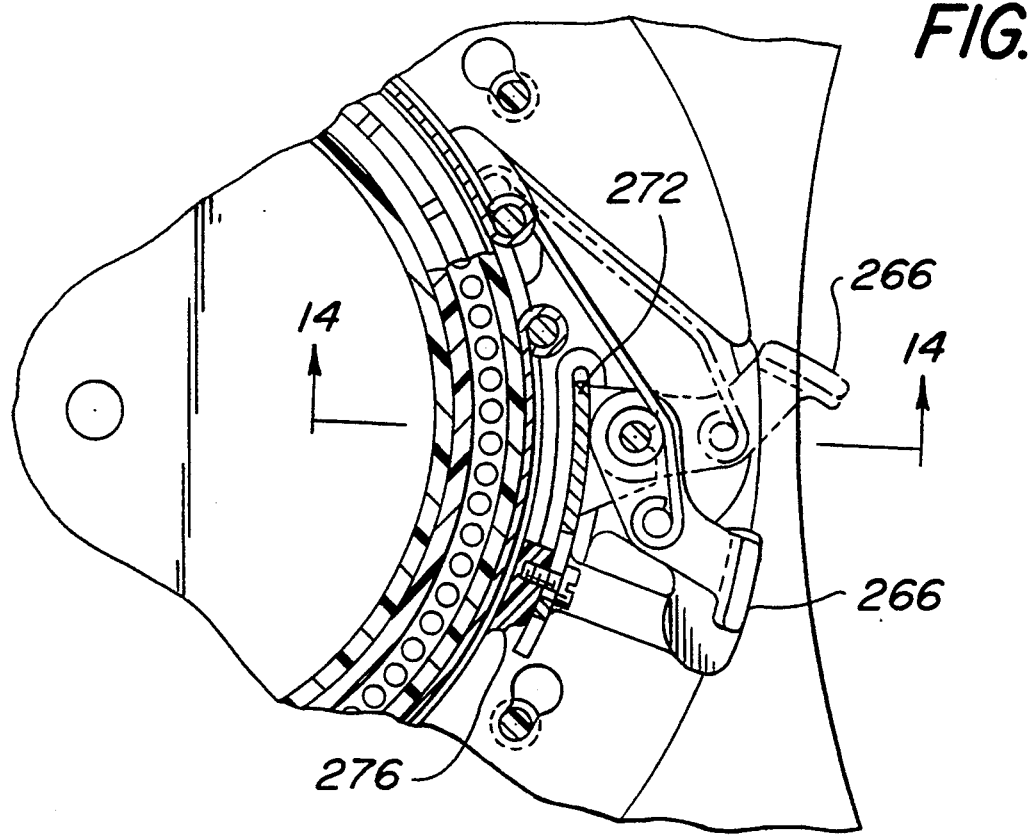
FIG. 12 is a broken away elevation view, partially in cross section of another embodiment of an adjustable tree stand similar to that shown in FIG. 11 with an adjusting means for the friction band.
Figure 13:
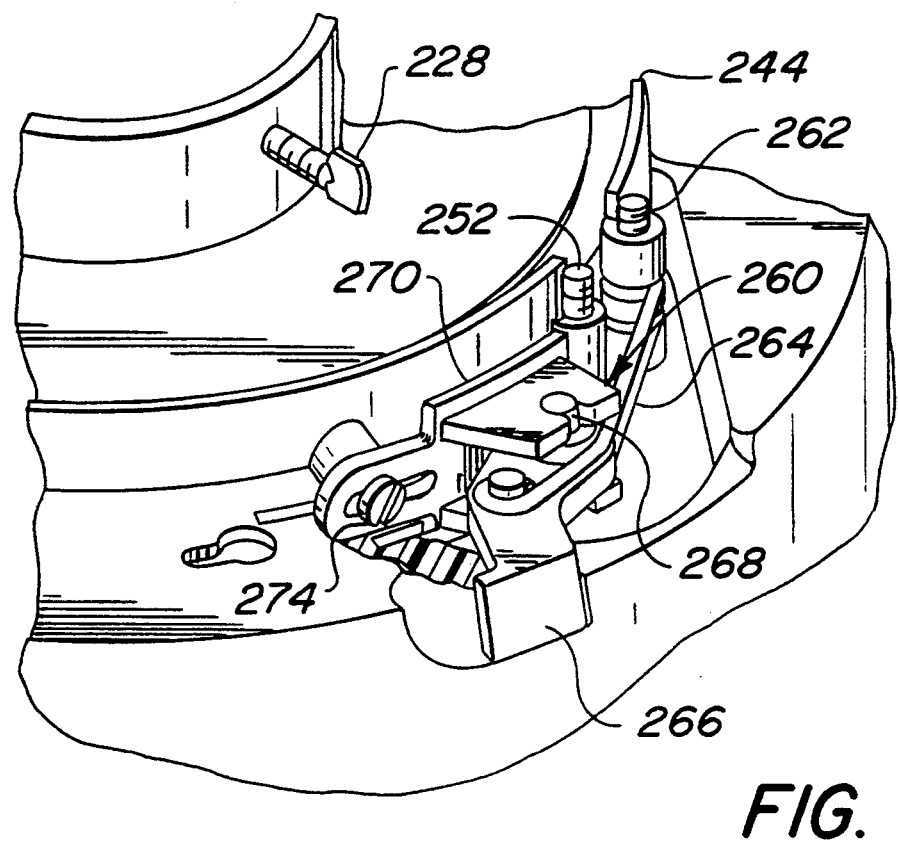
FIG. 13 is an elevation view substantially of the structure shown in FIG. 12 showing the friction band engaging means and its adjusting structure.

There is shown in FIGS. 12, 13 and 14 another embodiment of the present invention which is similar to that described with respect to FIGS. 9–11 except that it is provided with an adjusting block 260 for adjusting the degree of frictional engagement between band 244 and bearing assembly 220. Corresponding elements in the embodiment shown in FIGS. 12–14 and 9–11 are given the same numbers for ease of reference and explanation. Identical components such as the bowl 212, bearing assembly 220, base 240 are given the same numerals and will not be described in detail. Referring to FIGS. 12–14, the fixed end of friction band 244 is secured by bolt 252. Lever 266 is operable by means of connecting bar 264 and bolt 262 to cause tightening or engagement of band 244 and or release of the same. Lever 266 is pivotally mounted by means of pin 268 in adjusting block 260. Adjusting block 260 is provided with upper and lower projecting flanges 270 and 272 which are slidably mounted in slots molded into base 240. Specifically, upper flange 270 is slidable mounted in a slot formed in upper section 236 of base 240 and lower flange 272 is slidable mounted in a slot formed in lower section 238 of base 240. Adjusting block 260 may be locked in the desired adjusted position by a locking screw 274 which is screwed into a boss 276. FIG. 12 shows lever 266 in solid lines in the band engaged position and lever 266 in dotted lines in the released position.

As may be understood, base 210 and its sections may be made of any suitable material and particularly any suitable material such as those described with respect to base 84. The lower portion of section 238 which is normally in contact with the floor may have any suitable shape including being substantially flat or any suitable number of legs, preferably three or four, but more or less may be utilized for example, two legs may be utilized if they are very wide and more than four legs may be utilized. If the base were constructed of a bendable or malleable material, such as metal, the recess 232 may be formed therein after the bearing assembly is installed by bending down an upper flange to close the upper side of the recess, thereby avoiding the use of an upper and lower section for the base 210. Alternatively, clips or tabs may be used as the upper stop for recess 232. Other variations in the bowl, base and bearing assembly will be apparent to those skilled in the art.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. An adjustable tree stand, comprising:
   a bowl, said bowl adapted to being mounted to a lower end of a tree trunk utilizing fasteners for engaging the side of the tree trunk a predetermined distance from said lower end of said tree trunk and means mounted to the bottom of the bowl for engaging the cut end of the trunk;

a base shaped substantially to conform to the shape of the bowl and adapted to receive said bowl, said bowl adapted to be pivotally adjustable within said base; and a stopper member mounted within said base for fictionally engaging said bowl to lock said bowl in a pivotally adjusted position.

2. An adjustable tree stand in accordance with claim 1, wherein said bowl is substantially in the shape of a hemisphere with a flattened bottom.

3. An adjustable tree stand in accordance with claim 1, wherein said base is comprised of a pair of interlocking members forming a cross when viewed in plan view.

4. An adjustable tree stand in accordance with claim 1, wherein said bowl is provided with a stopper ring lip which limits the amount of pivotal adjustment.

5. An adjustable tree stand in accordance with claim 4, wherein said stopper ring lip engages at one point a recess of a predetermined depth when adjusted to the pivotal position which is the maximum deviation from vertical.

6. An adjustable tree stand in accordance with claim 1, wherein said bowl is substantially closed from its outer periphery to a centrally disposed ring for receiving the tree trunk.

7. An adjustable tree stand in accordance with claim 6, wherein said closed portion of said bowl is provided with openings for pouring water into the bowl.

8. An adjustable tree stand in accordance with claim 6, wherein said fasteners for engaging the side of the tree trunk are mounted through said ring.

9. An adjustable tree stand in accordance with claim 1, wherein said base member is comprised of wood.

10. An adjustable tree stand in accordance with claim 1, wherein said base is comprised of a synthetic material.

11. An adjustable tree stand in accordance with claim 1, wherein said base is comprised of metal.

12. An adjustable tree stand in accordance with claim 1, wherein said base is provided with four legs.

13. An adjustable tree stand in accordance with claim 1, wherein said means mounted to the bottom of the bowl is a spike having one or more lateral projections.

14. An adjustable tree stand in accordance with claim 1, wherein said stopper member is comprised of a frictional bowl engaging component which is forced against the bowl by a lever operated cam.

15. An adjustable tree stand in accordance with claim 14, wherein said base member is provided with an elliptical finger relief for a lever of the lever operated cam to enable easy release of the stopper.

16. An adjustable tree stand in accordance with claim 1, wherein said stopper member is comprised of a frictional bowl engaging component which is forced against the bowl by a threaded rod adapted to be rotated.

17. An adjustable tree stand in accordance with claim 1, wherein said bowl may be rotated within said base and locked in said rotated position by said stopper member.

18. An adjustable tree stand in accordance with claim 1, wherein said base is provided with a resilient contact surface in an area at least substantially opposite said stopper member.

19. An adjustable tree stand in accordance with claim 18, wherein said contact surface is in the form of a resilient bead on a surface of said base which comes in contact with said bowl.

20. An adjustable tree stand, comprising:

a bowl, said bowl adapted to being mounted to a lower end of a tree trunk utilizing fasteners for engaging the side of the tree trunk a predetermined distance from said lower end of said tree trunk and means mounted to the bottom of the bowl for engaging the cut end of the trunk;

a bearing assembly mounted on said bowl;

a base adapted to receive said bowl, said base being provided with means for retaining said bearing assembly within a predetermined angle measured from horizontal, said bowl adapted to be pivotally adjustable both rotationally and as measured from vertical within said base; and a locking means mounted within said base for fictionally engaging said bearing assembly to lock said bowl in a pivotally adjusted position.

21. An adjustable tree stand in accordance with claim 20, wherein said bearing assembly is comprised of a first ring secured to said bowl and a second ring rotatable mounted to said first ring.

22. An adjustable tree stand in accordance with claim 20, wherein said locking means is comprised of a band operable to fictionally engage said bearing assembly.

23. An adjustable tree stand in accordance with claim 22, wherein said band fictionally engages said first and second rings.

24. An adjustable tree stand in accordance with claim 22, wherein said locking means includes means for adjusting said band.

25. An adjustable tree stand in accordance with claim 20, wherein said bearing assembly is mounted on said bowl by frictional engagement.

26. An adjustable tree stand in accordance with claim 20, wherein said retaining means of said base is a recess formed in said base for at least partially receiving said bearing assembly.

27. An adjustable tree stand in accordance with claim 22, wherein said band is operable by a pivotally lever.

28. An adjustable tree stand in accordance with claim 26, wherein said base is formed of an upper section and a lower section which may be secured together to form said recess.

* * * * *

UNITED STATES PATENT AND TRADEMARK OFFICE
CERTIFICATE OF CORRECTION

PATENT NO. : 5,393,031
DATED : February 28, 1995
INVENTOR(S) : Domenic R. Leve

It is certified that error appears in the above-identified patent and that said Letters Patent is hereby corrected as shown below:

Column 10, line 23, delete "bowl,said", insert --bowl, said--;

Column 10, line 29, delete "fiction-", insert --friction---;

Column 10, line 34, delete "rotatable", insert --rotatably--;

Column 10, line 38, delete "fictionally", insert --frictionally--;

Column 10, line 40, delete "fictionally", insert --frictionally--.

Signed and Sealed this

Thirtieth Day of May, 1995

Attest:

BRUCE LEHMAN

*Attesting Officer*      *Commissioner of Patents and Trademarks*